United States Patent Office 3,545,183
Patented Dec. 8, 1970

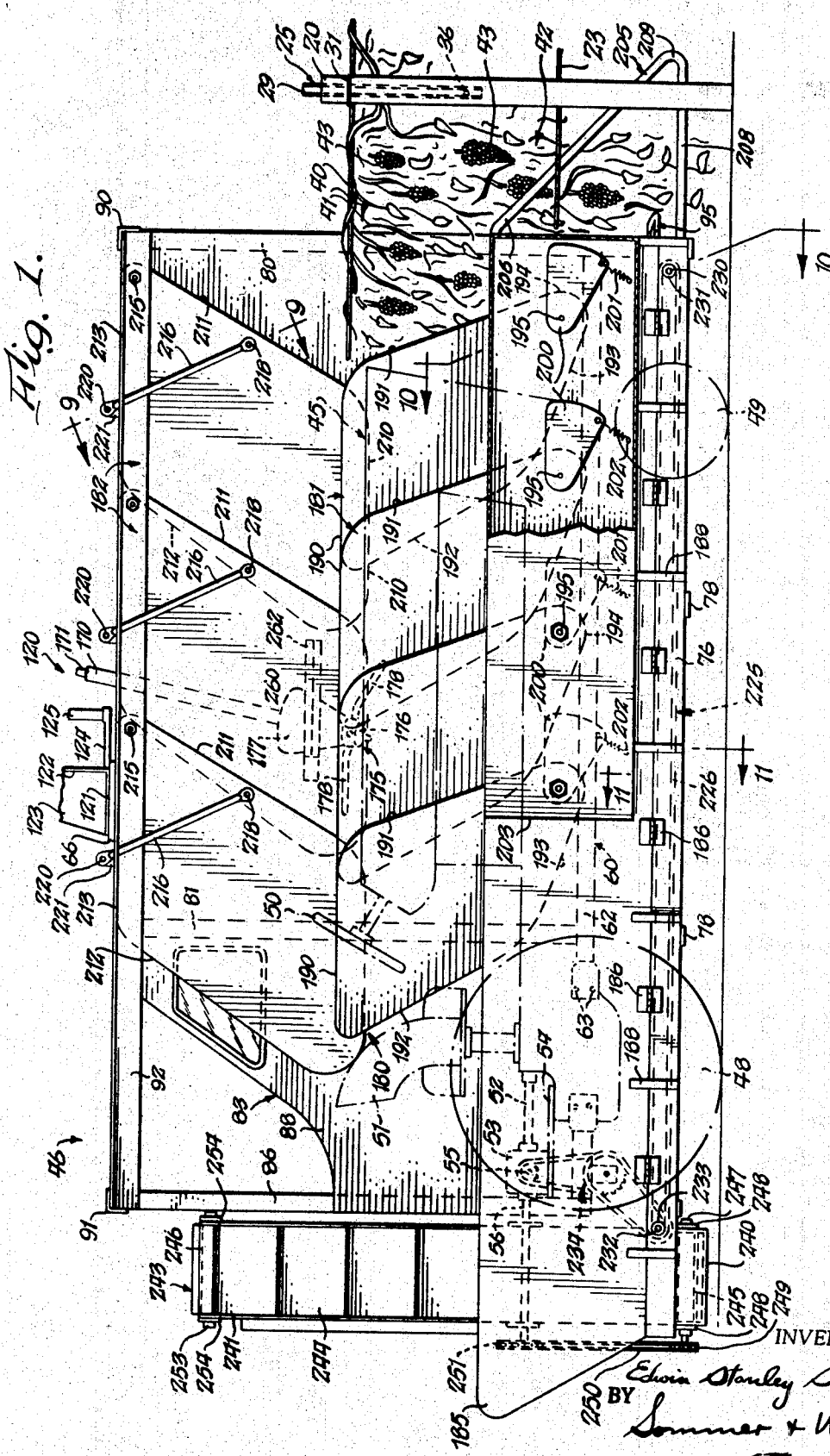

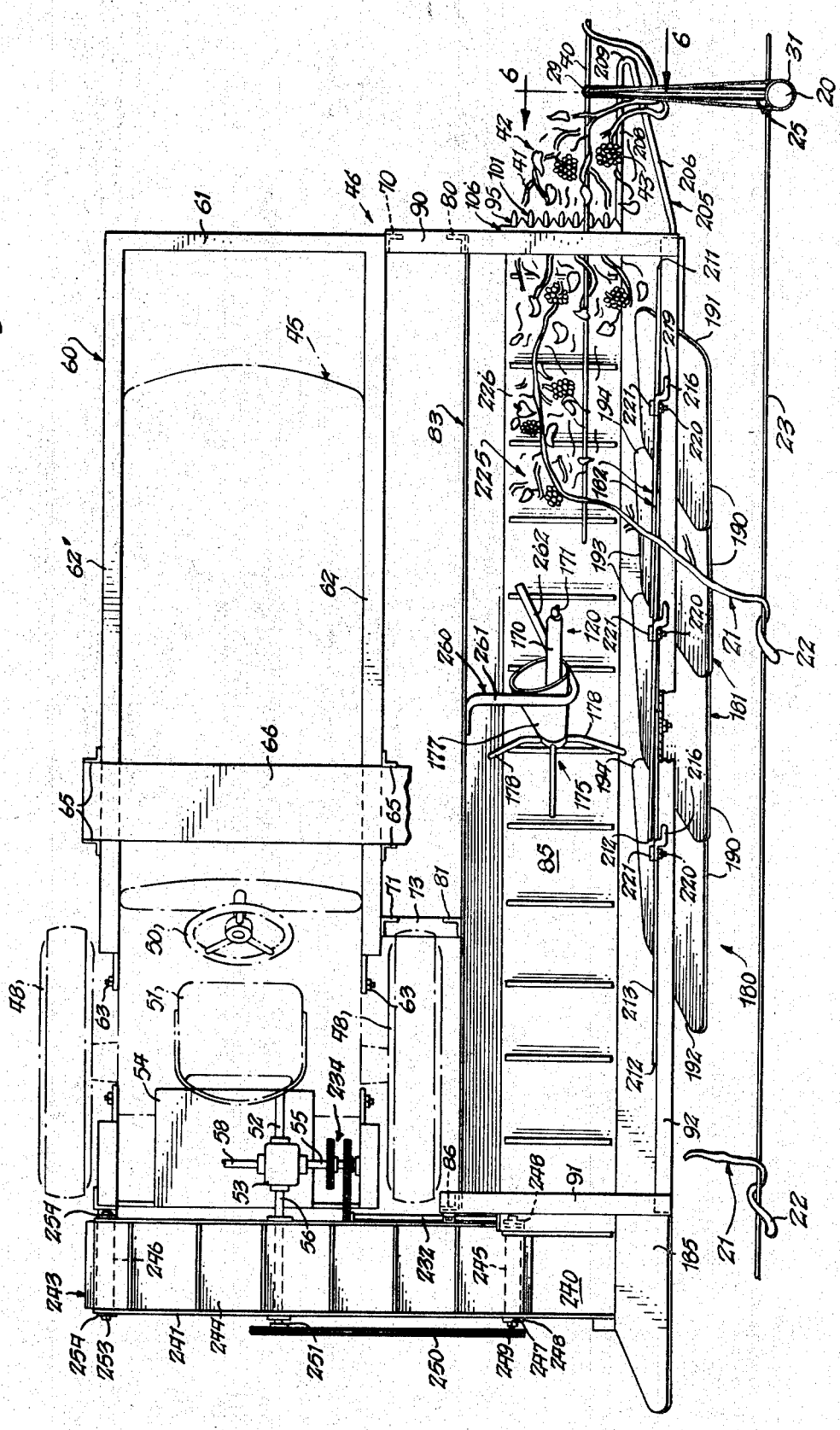

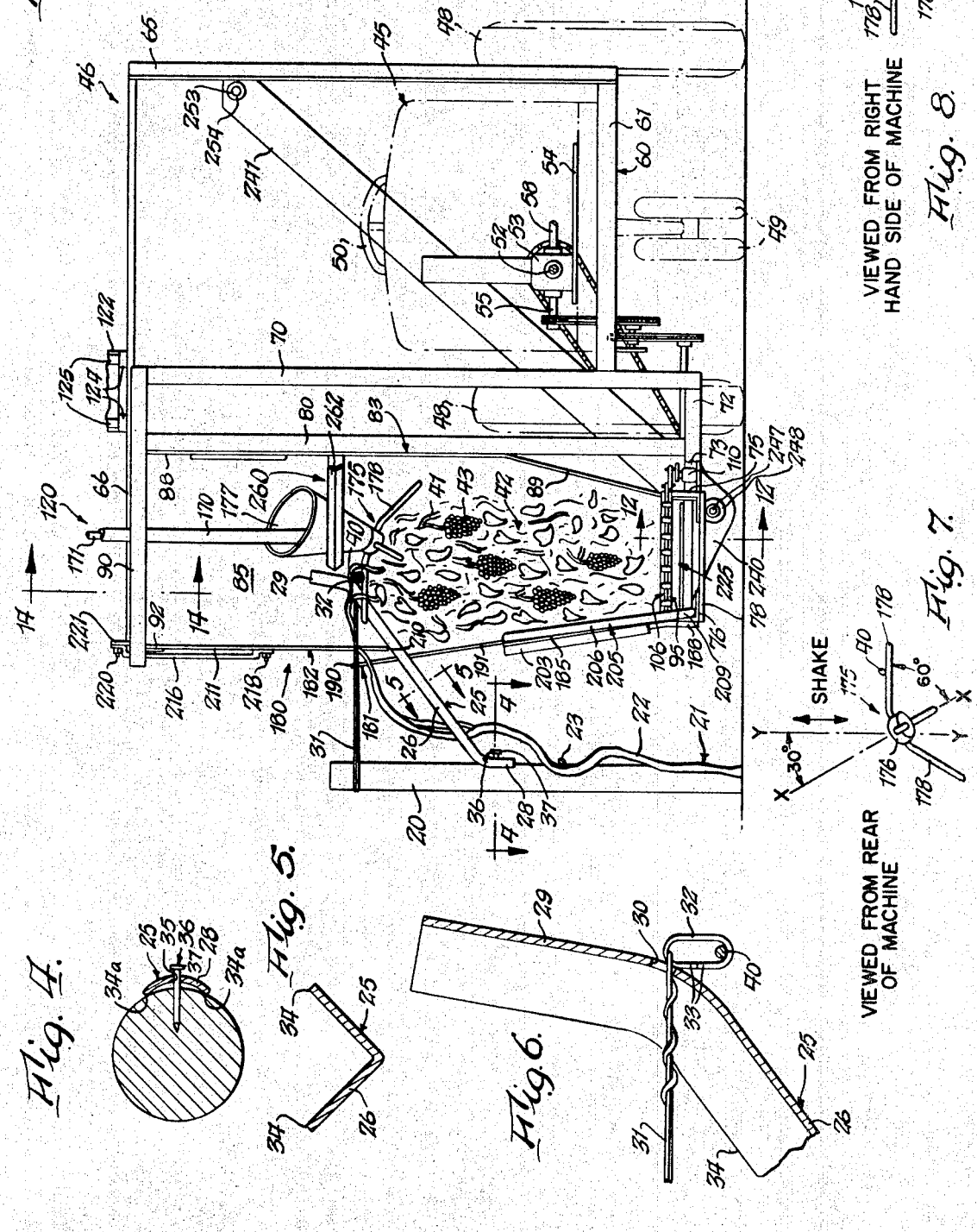

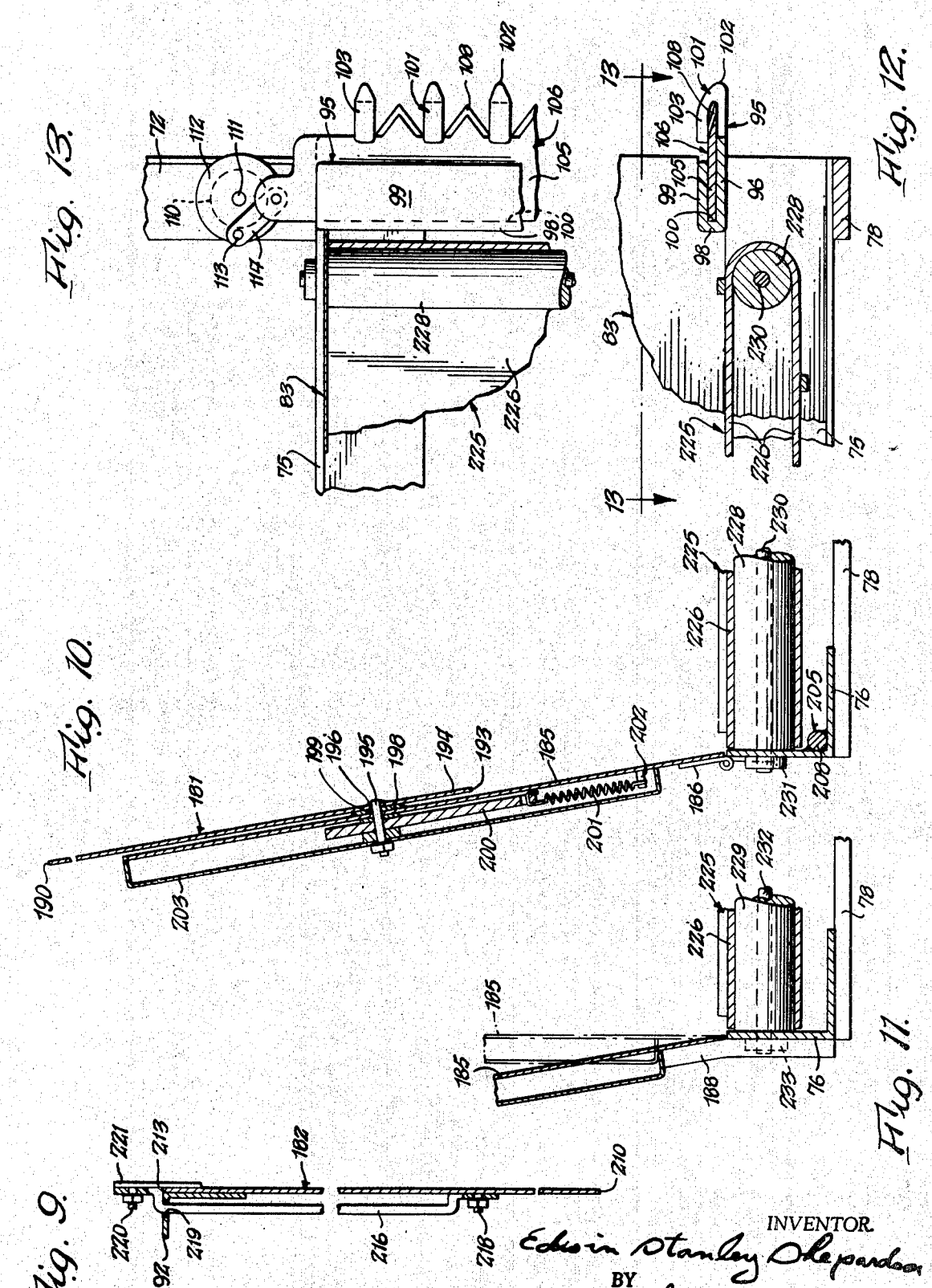

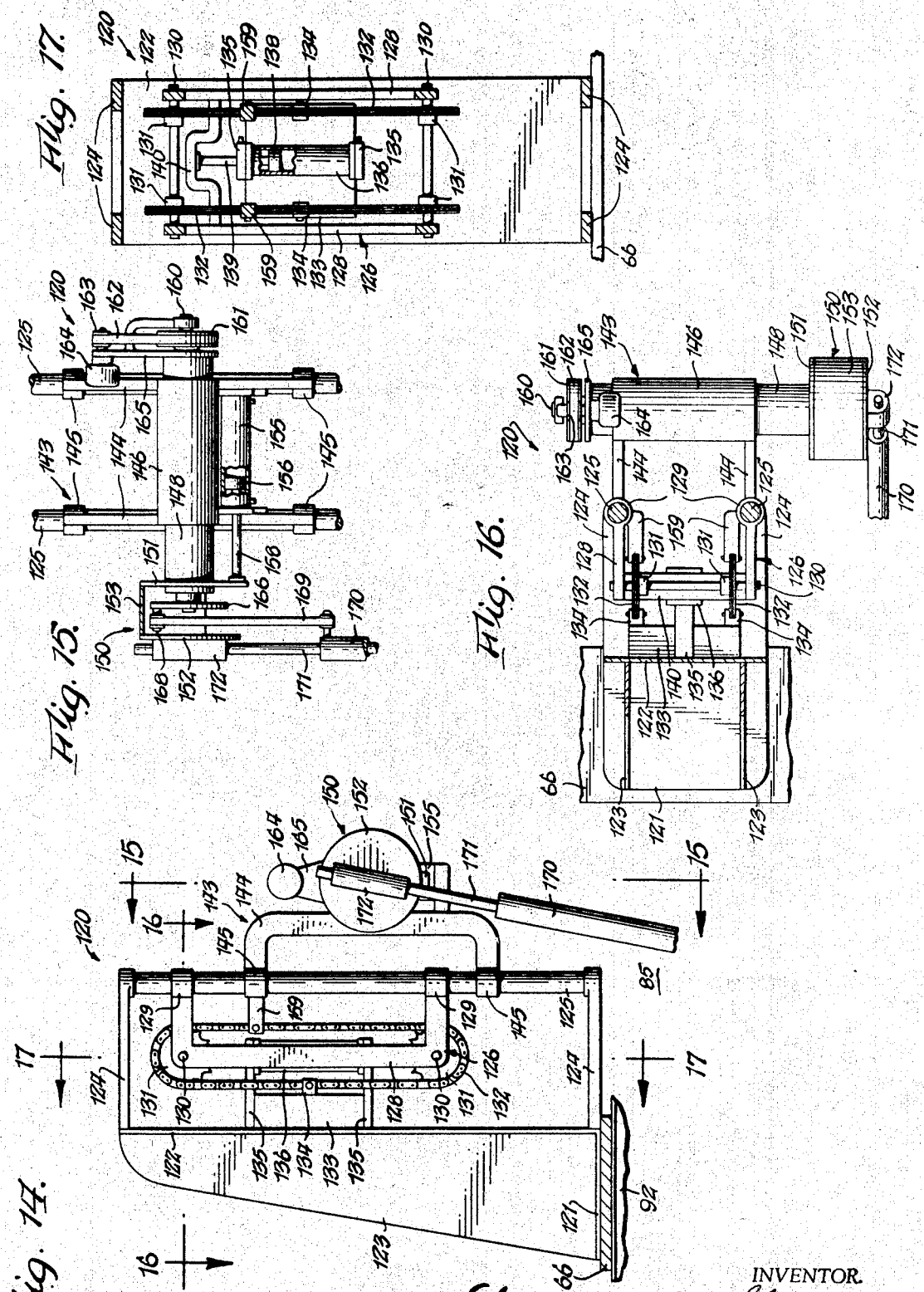

3,545,183
METHOD FOR HARVESTING GRAPES
Edwin Stanley Shepardson, Ithaca, N.Y., assignor to New York State Concord Grape Production Research Fund, Inc.
Original application Apr. 16, 1965, Ser. No. 449,394, now Patent No. 3,380,236, dated Apr. 30, 1968. Divided and this application Apr. 25, 1968, Ser. No. 834,914
Int. Cl. A01g *19/00*
U.S. Cl. 56—1                                                   7 Claims

ABSTRACT OF THE DISCLOSURE

Clustered fruit is harvested from plants, such as grape vines, which have been trained into the form of a curtain suspended from a generally horizontal wire by projecting from one side of the wire a generally horizontal arm endwise into the curtain, and moving the arm transversely of itself to remove inertially the fruit from the plants.

---

This application is a division of my copending application Ser. No. 449,394 filed Apr. 16, 1965, now issued as United States Pat. No. 3,380,236 dated Apr. 30, 1968 for Apparatus For Harvesting Grapes, in turn a continuation-in-part of my then copending application (now abandoned) for Grape Harvesting Machine, filed Mar. 30, 1961, Ser. No. 99,507.

This invention relates to a method for harvesting grapes and other vine-borne clustered fruit and more particularly to harvesting fruit from such vines supported by a trellis so constructed that the clusters hang down from a curtain of canes supported over an unobstructed space.

One of the principal objects of the present invention is to provide a method for harvesting grapes which may be practiced by a mobile harvester adapted to be propelled through the vineyard successively alongside the rows of vines supported by such trellises and which rapidly harvests the grapes, principally as berries, from the curtain of fruit bearing canes and conveys the same away from the zone of harvesting with a minimum loss of fruit. To this end, the harvester includes a frame having opened side walls forming a horizontal way receiving the curtain of canes and into which the berries and bunches of grapes are shaken, the bottom of the way being in the form of an endless conveyor to gather the berries and bunches of fruit so shaken into the way.

Another object is to provide a method for harvesting grapes which may be practiced by such a harvester in which said side walls extend above the level of the top of the curtain of vines to prevent the escape of berries flung upwardly by a shaking mechanism.

Another object is to provide a method for harvesting grapes which may be practiced by such a harvester which operates with minimum bruising or injury to the fruit, this being accomplished by progressively inserting arms or bars endways into the side of the curtain of fruit bearing canes, preferably horizontally and into contact with the under side of the longitudinal trellis wire supporting the curtains, and vibrating or shaking the arms laterally to shake the fruit loose from the canes, principally as individual berries.

Another object is to provide a method for harvesting grapes which may be practiced by apparatus which operates with a minimum shaking out of leaves or trash from the curtain of fruit bearing canes, this being accomplished by mounting the bars or arms as spokes radiating from a freely rotatable hub of a rotor moved alongside the curtain of fruit bearing canes in position that the movement of the harvester alongside the rows of vines causes the bars or arms progressively to enter, penetrate and leave the curtain with their outer ends travelling at approximately the same speed as the ground speed of the harvester.

Another object is to provide a method for harvesting grapes which may be practiced by apparatus which includes such a rotor the radiating arms of which tend to maintain contact with the under side of the longitudinal trellis wire supporting the curtain of fruit bearing canes. This is accomplished by arranging these bars or arms so their effective upper surfaces converge conically upwardly to their supporting hub whereby the rotor can be arranged so that the outboard ends of these bars or arms enter the curtain of canes below the level of the adjacent part of the longitudinal trellis wire, and whereby upon engaging the under side of this longitudinal trellis wire the arms tend to lift and support the load carried by the wire thereby to permit of imparting highly effective shaking action from the arms or bars, through the longitudinal trellis wire, to the canes and fruit supported thereby.

Another object is to provide a method for harvesting grapes which may be practiced by apparatus which further insures the radiating arms of such rotor coming into contact, and maintaining contact with the under side of the longitudinal trellis wire supporting the curtain of fruit bearing canes. This is achieved by sloping the axis of the rotor, fore-and-aft of the line of travel of the harvester, with reference to the true vertical, so that the tips of the arms entering the curtain of fruit bearing canes are at a low elevation and thereafter rise to engage the under side and lift the longitudinal trellis wire to transmit its shaking action to this trellis wire.

Another object is to provide a method for harvesting grapes which may be practiced by such a grape harvester in which the rotor can be readily repositioned to have effective contact with the under side of the longitudinal trellis wire either in initially setting up the harvester for operation or in the event such contact should be lost. This is effected by an articulated mounting for the rotor under control of hydraulic cylinders or the like whereby the rotor can be intentionally withdrawn horizontally from the side of the curtain of fruit bearing canes, raised or lowered to any selected elevation and then moved horizontally back into the curtain.

Other objects and advantages of the invention will be apparent from the following description and drawings in which:

FIG. 1 is a side elevational view of a harvester for practicing the method of the present invention and showing the same picking grapes from a curtain of fruit bearing canes suspended from and carried by the generally horizontal longitudinal wire of a special form of trellis adapted for use with the harvester.

FIG. 2 is a top plan view thereof.

FIG. 3 is a front elevational view thereof.

FIGS. 4 and 5 are enlarged sectional views of the trellis taken on the correspondingly numbered lines on FIG. 3.

FIG. 6 is an enlarged vertical sectional view of the trellis taken generally on line 6—6, FIG. 2.

FIG. 7 is a diagrammatic representation of the spoked rotor of the shaking mechanism showing its axial relation to the line of shake as viewed from the rear of the harvester.

FIG. 8 is a view similar to FIG. 7 showing the line of shake as viewed from the right hand side of the harvester and the relation of the axis of the rotor to this line of shake.

FIGS. 9, 10 and 11 are enlarged fragmentary generally vertical sectional views taken on the correspondingly numbered lines on FIG. 1.

FIG. 12 is an enlarged fragmentary vertical sectional view taken generally on line 12—12, FIG. 3.

FIG. 13 is an enlarged fragmentary plan view taken generally on line 13—13, FIG. 12.

FIG. 14 is a fragmentary, enlarged section taken generally on line 14—14, FIG. 3 and showing a side elevational view of the shaker mechanism of the harvester.

FIG. 15 is a fragmentary vertical section through the shaker mechanism taken generally on line 15—15, FIG. 14.

FIG. 16 is a fragmentary horizontal section through the shaker mechanism taken generally on line 16—16, FIG. 14.

FIG. 17 is a fragmentary vertical section through the shaker mechanism taken generally on line 17—17, FIG. 14.

VINE TRELLIS AND GRAPE VINE

In the use of the harvester it is necessary to train the canes of the vines along a generally horizontal, longitudinal wire of a trellis from which the fruit bearing canes hang as a curtain, this longitudinal trellis wire being supported in horizontally spaced parallel relation to a line of supporting grape posts so that the shaker bars or arms of the harvester can be projected under the longitudinal trellis wire into the curtain of fruit bearing canes trained along the wire, the bars or arms being vibrated up and down at an angle to the vertical in contact with the under side of the longitudinal trellis wire to shake the ripe fruit from the canes.

To this end the wooden grape posts 20 of an existing vineyard must be modified to permit of so training the vines 21. If an existing vineyard is modified for machine harvesting in accordance with the present invention, the existing wooden grape posts 20 can be of round or rectangular form in cross section, usually being from 3½ inches to 5 inches in maximum cross section, and they are spaced from one another to accommodate several vines 21 in the space between each pair of posts, the vines being planted away from the posts 20 to facilitate vineyard cultivation and to permit post replacement without disturbing the roots of the vines. To train the trunks 22 of the vines in providing the required hanging curtain of fruit bearing canes, a wire 23 can be secured to the bottom parts of the grape posts of a row and the trunks 22 tied to these wires 23 during the training period of the young vines. The harvester is propelled between each pair of rows and harvests the grapes of at least one of these rows, a harvester for a single row being illustrated.

A special form of trellis, such as that shown, is desirable for use with the harvester as shown and described. This special form of trellis includes a sheet metal arm member 25 of channel or angle form in cross section, being shown as being in the form of a rectangular shaped channel, the sides of the body part of which are preferably at a 90° included angle with reference to each other. The arm is formed to provide a central body portion 26 having a vertical downward continuation 28 at its lower inboard end which hugs one side of the grape post 20 and an upstanding continuation 29 at its upper outboard end. The body portion 26 projects upwardly and outwardly from the grape post 20 preferably at an included angle of about 30° and the bottom projection or continuation 28 thereof is secured to the grape post at such elevation that the line of juncture between the body 26 and upper outboard extension 29 thereof is in horizontal alinement with the top of the grape post.

At this point of juncture the arm is provided with a hole 30 through the bottom of the channel or angle iron and through this hole is passed one end of a horizontal transverse grape post wire 31. This end is also threaded through and secured to a split link 32, such as one made of a length of standard chain wire formed into the split link with its ends 33 in abutting relation to each other. This split link 32 is arranged on the side of the arm 25 remote from the grape post 20 and the opposite end of the horizontal transverse grape post wire 31 is drawn to hold the body portion 26 at the desired angularity of about 30° with reference to the grape post and is suitably secured to the top of the grape post 20 in conventional manner as by looping it around the grape post.

In forming the bottom extension 28 of the arm 25 the sides of the channel or angle are spread apart so that the opposite side edges 34a are more widely spaced than the opposite side edges 34 of the body 26 of the arm. These edges 34a of each arm 25 bear against the side of its grape post 20 and by virtue of their wide spacing from each other provide a more stable footing against the grape post. It will be noted that the curvature or concave form of each bottom extension 28 is such that its only engagement with the side of the grape post is through its edges 34a, this providing maximum stability to resist side pull in the direction of the grape wire 23.

Midway between these edges 34a of the downward vertical extension 28 of each arm 25 and near the upper end of this bottom extension 28, it is provided with a nail hole 35 through which a nail 36 is driven horizontally into the wooden grape post 20. This nail is initially driven home so that its head 37 is tight against the exterior or convex side of the vertical bottom extension 28. However, in the operation of the harvester, the arms 25 can be lifted, and to permit such lifting, each arm can fulcrum about the upper extremities of the side edges 34a of the bottom extension 28, prying out the nail 36 in such fulcruming to a limited extent. The nail continues to function in attaching its bottom extension 28 to its grape post 20 but permits limited upward movement of the outboard end of the arm 25, such movement being accommodated by the flexibility of the grape post wire 31.

The split links 32 of a row of grape posts 20 carry the main longitudinal trellis wire 40 which supports the fruit bearing canes. It is unnecessary to thread this longitudinal trellis wire through the successive links 32 in setting up the trellis. Thus the longitudinal trellis wire 40 can be laid or payed out alongside a row of grape posts 40 to which the arms 25 have been attached. The main longitudinal trellis wire 40 can then be attached by spreading the ends 33 of each split link 32 progressively along the row, inserting the main longitudinal trellis wire 40 into the spread apart or opened link, and then forcing the ends 33 of the opened link back into abutting relation with each other as shown in FIG. 6.

From the trellis wire 23 the main trunk 22 of each vine 21 is also trained out to the main longitudinal grape trellis wire 40. From the end of each trunk, fruit bearing canes 41 are trained along the longitudinal trellis wire 40, these canes forming a curtain 42 extending along, and hanging from, the main longitudinal trellis wire 40. The clusters of grapes are designated at 43 and hang from the curtain 42 of fruit bearing canes 41.

TRACTOR AND POWER TAKE-OFF

The machine embodying the present invention can be self-propelled in any suitable manner, as by having its own prime mover, but is shown as carried by a conventional farm tractor 45 shown in broken lines in FIGS. 1 and 2 as having the conventional chassis supporting the framework 46 of the harvesting machine and supported by a pair of large rear drive wheels 48 and a pair of smaller front steering wheels 49 turned by means of a manned steering gear wheel 50 by a driver seated on a tractor seat 51. For operating various moving parts of the harvesting machine, a power take-off shaft 52 is driven by the tractor 45, this shaft leading to a gear box 53 suitably mounted on a plate 54 bolted to the tractor 45 and driving three driven shafts 55, 56 and 58.

FRAME OF HARVESTER PICKING MECHANISM

The framework 46 of the harvesting machine can be of any suitable construction but is shown as comprising a lower horizontal U-shaped frame 60, having a cross bar 61 arranged in front of the lower part of the tractor and horizontal legs or bars 62, 62' extending rearwardly along opposite sides of the tractor and secured at their rear ends, as by bolts 63, to the tractor chassis near the driver's seat 51. A pair of vertical angle-iron center posts 65 are arranged in fore-and-aft spaced relation to each other and are secured at their lower ends to, and project upwardly from, the center of each horizontal bottom frame bar or legs 62, 62'. To the upper ends of these center posts 65 is fixed a horizontal transverse top plate 66 which extends transversely of the line of movement of the harvesting machine and projects outwardly beyond the horizontal bottom frame bar 62 as best shown in FIGS. 2 and 3.

The frame of the harvesting machine also includes a front angle-iron post 70 secured to the front end of the bottom frame bar 62, this front post 70 projecting both upwardly and downwardly from this bottom frame bar 62. A rear angle-iron post 71 is secured to this bottom frame bar 62 near its rear end and also projects both upwardly and downwardly therefrom.

Horizontal transverse angle iron bars 72 and 73 are secured at one end to the bottoms of the downwardly projecting portions of these front and rear posts 70 and 71, respectively, and extend transversely of the line of movement of the harvesting machine away from the tractor 45. These horizontal transverse angle bars 72, 73 carry a pair of transversely spaced horizontal angle-iron bars 75 and 76 which extend lengthwise of the line of movement of the harvesting machine, these horizontal angle-iron bars being also supported at spaced intervals by transverse connecting plates 78.

Two posts 80 and 81 are secured at their bases to, and rise upwardly from, the bottom cross bars 72 and 73, respectively, these posts being spaced transversely of the line of movement of the harvester with reference to the posts 70 and 71 and away from the tractor 45, this spacing being to accommodate the drive wheels 48 of the tractor as best shown in FIGS. 1 and 2.

These posts 80 and 81 support a sheet metal wall 83 which extends lengthwise of the line of movement of the harvester and forms the inner wall of a way 85 for the pendant curtain 42 of canes 41 carried by the trellis. This inner wall is also connected along its vertical rear edge to a third or rear vertical post 86 which is in line with the posts 80 and 81 and is arranged adjacent the rear end of the tractor 45. This inner wall 83 has a vertical upper part 88 secured to the upper parts of these posts 80, 81, 86 and a lower part 89 which is inclined downwardly and away from the tractor 45 to provide a constricted lower end for the way 85. The lower edge of this lower part 89 of the inner sheet metal wall 83 is preferably fixed to the innermost angle iron 75 of the pair of horizontal angle irons 75, 76 at the bottom of the way 85.

The frame of the harvester additionally includes a pair of transverse frame top bars 90 and 91 at the front and rear ends of the way 85, respectively, these being fixed to and extending horizontally from the posts 80 and 86 across the way 85. The outboard ends of these top transverse frame bars are connected by a horizontal top frame bar 92, preferably in the form of an angle-iron having a top flange projecting horizontally away from the tractor 45 and a downwardly projecting vertical flange.

VINE CUTTING MECHANISM

The curtain 42 of canes 41 supported by the longitudinal trellis wire 40 can grow to produce overgrown canes which sprawl down to the ground and sideways. No bunches 43 grow on such stringers of these canes, and these stringers have been found to interfere with the harvesting of the grapes, particularly in their getting tangled in the harvester or being dragged along the grapes and berries which have been shakes from the curtain 42 of canes onto the conveyer hereinafter described.

To remove such stringers, cutters can be provided at any desired location at the entrance to the way 85, only a bottom cutter being shown, this being shown as comprising a stationary cutter bar 95 fixed at its opposite ends to the forward ends of the transversely spaced horizontal angle bars 75, 76 of the harvester frame 46, and bridging the space therebetween. As best shown in FIGS. 12 and 13, this fixed cutter bar 95 has a bottom wall 96, a vertical rear wall 98 and a rear top wall 99 forming a longitudinal slot 100 which faces forwardly with reference to the direction of movement of the harvester. Projecting forwardly from the front edge of the bottom wall 96 are a series of spaced stationary teeth 101 which are C-shaped in cross section, each having a nose 102, the upper part of which is continued rearwardly in the form of a flange 103. In the slot 100 is slidingly mounted the body part 105 of a saw bar 106, this saw bar having V-shaped saw teeth 108 projecting forwardly from this slot 100 into the internal spaces of the stationary teeth 101. The saw bar teeth 108 are sharp edged and as the saw bar 106 is reciprocated longitudinally in the slot 100 any canes 41 coming in contact with these teeth are brought into shearing relation with the stationary cutting teeth 101 and severed. The means for effecing such movement of the saw bar 106 is preferably constructed as follows:

The numeral 110 represents a hydraulic motor suitably mounted on the front end of the frame bar 72 with its drive shaft 111 disposed vertically. On the upper end of this motor drive shaft is fixed a crank disk 112 carrying an upstanding crank pin 113. This crank pin is pivotally connected by a link 114 with the adjacent end of the saw bar 106 as best shown in FIG. 13.

PICKING MECHANISM

In its movement through the vineyard, the operator of the tractor 45 steers it, using the visible upwardly projecting ends 29 of the trellis arms 25 as guides, so that the way 85 of the harvesting machine passes under the longitudinal trellis wire 40 supported by the arms 25 on the grape posts 20, and therefore under and along the curtain 42 of canes 41 and pendant bunches of grapes 43, and to a limited extent whole bunches 43 of grapes, are shaken off the curtain of fruit bearing canes and fall into the way 85 to be conveyed away.

The picking mechanism by which the berries from and whole pendant bunches 43 are shaken from the wire 40 supporting the curtain of fruit bearing canes is preferably constructed as follows:

The numeral 120 represents a picking mechanism supporting standard mounted on the framework plate 66 at the center of the open upper end of the way 85. This standard is shown as comprising a base 121, an upright rectangular plate 122 rising from one side of the base and extending transversely of the way 85 and diagonal vertical brace plates 123. Arms 124 project horizontally outwardly from the four upper and lower corners of the upright plate 122 generally parallel with the way 85 and at their outer ends support two upright laterally spaced parallel rods 125.

On this pair of rods is slidingly mounted a first carriage 126, this comprising two upright side plates 128 each having upper and lower slide bearings 129 embracing a corresponding upright rod 125 and these side plates 128 being connected together by horizontal rods 130 fastened thereto. On each of these horizontal rods 130 are journalled a pair of transversely spaced sprockets 131, these sprockets being freely rotatable on the horizontal rods and each sprocket on the lower horizontal rod 130 being in vertical alinement with a corresponding sprocket 131 on the upper rod 130 and carrying an endless chain 132. On the upright plate 122 of the standard 120 is fixed a block 133 carrying two anchor fasteners 134 secured to the centers of the adjacent stretches of the chains 132. Arms 135 also project horizontally outwardly from the upper and lower ends of the block 133 into the space between the chains 132. On the outboard ends of these arms 135 is mounted a vertical hydraulic cylinder 136 containing a piston 138 connected to a piston rod 139 projected vertically through the upper end head of this cylinder. The upper end of this piston rod is connected to a horizontal cross bar 140 between the side plates 128 of the first carriage 126.

It will be seen that projecting the piston rod 139 upwardly, say, one inch, effects a corresponding upward movement of the first carriage 126 of one inch, but because of the chains 132 being anchored at 134, the outer stretches of these chains 132 move upwardly two inches. The purpose of this chain arrangement on the first carriage 126 is to effect such doubling of the effective movement of the piston rod 139.

On the pair of stationary rods 125 is slidingly mounted a second carriage 143, this comprising two upright side plates 144 each having upper and lower slide bearings 145 embracing a corresponding upright rod 125 and these side plates being connected together by a horizontal cylindrical slide bearing block 146 to the ends of which these side plates 144 are fixed in any suitable manner. This slide bearing block 146 extends crosswise of the way 85 and slidingly supports a horizontal cylindrical slide 148 for coaxial movement transversely of the way 85.

To one end of this cylindrical slide 148 is fixed an enlarged circular end head indicated generally at 150 and comprising a vertical inner disk 151 fixed to the end of the cylindrical slide 148, an outer vertical disk 152 spaced axially from the inner disk 151 and a peripheral semi-cylindrical web 153 connecting the upper parts only of the disks 151, 152.

The cylindrical slide 148 is reciprocated longitudinally by a horizontal hydraulic cylinder 155 the opposite ends of which are suitably fixed to the side plates 144 of the second carriage 143. The piston 156 in this cylinder actuates a piston rod 158 projecting outwardly from one end thereof and secured at its outer end to the inner disk 151 of the end head 150.

The second carriage 143 is moved vertically in response to vertical movement of the chains 132 of the first carriage 126 and hence the vertical movement of the second carriage 143 is double the vertical movement of the first carriage 126. This is effected by an arm 159 on each side plate 144 of the second carriage 143 projecting toward and fastened to the adjacent stretch of the corresponding chain 132.

A picking mechanism drive shaft 160 journalled coaxially within the cylindrical slide 146 is rotated by means of a pulley 161 fixed to one end thereof. Through a belt 162 this pulley is rotated from a pulley 163 on the motor shaft of a motor 164. This motor is mounted on an upright plate 165 fixed to the corresponding end of the cylindrical slide 148.

To the opposite end of the shaft 160 is fixed a crank 166, the crank pin 168 of which is pivotally connected to the upper end of a connecting rod 169. The lower end of this connecting rod 169 is pivotally connected to an upright tube 170 slidingly mounted on an upright supporting rod 171 which projects downwardly into the way 85. The upper end of this supporting rod 171 is fixed in a sleeve 172 in turn fixed to the outer disk 152 of the end head 150 of the cylindrical slide 148. This supporting rod 171 projects downwardly into the way 85 in a vertical plane parallel with the way but at an angle to the vertical along this plane. This angularity is downwardly and rearwardly with reference to the direction of travel of the harvester and is at an included angle of about 20° with reference to the vertical.

At its lower end the upright tube or shaft 170 carries a freely rotatable rotor 175 journalled thereon. This rotor comprises a hub 176 having fixed thereto a conical skirt 177 and also rodlike bars or arms 178 projecting radially therefrom. The axis x—x of this hub 176 intersects the axis y—y of the rod 171 and tube or shaft 170 and is in a plane parallel with this last axis viewed from the side of the machine (FIG. 8) but is at an acute included angle of about 30° relative to this last axis y—y when viewed from the front or rear of the harvester (FIG. 7). The radial arms 178 of the rotor 175 are at a downwardly divergent angle with reference to the axis x—x of the rotor 175, this being at an included angle of about 60° with reference to this axis x—x. The purpose of this angularity of these axis and the angularity of these radial bars or arms is to insure the arms entering the curtain 42 of canes supported on the trellis wire 40 passing under but close to the wire 40 as hereinafter described. The purpose of the cylinders 136 and 155 and the above described articulated mounting for the rod 171, rotor 175 and mechanism for shaking these parts longitudinally of the rod 171 is to permit of rapidly bringing the radial arms or bars 178 back under the longitudinal trellis wire 40, as hereinafter described, in the event they accidentally become misplaced to enter the curtain 42 of canes above the wire 40. The conical skirt 177 projects upwardly around the lower end of the tube or shaft 170 and prevents canes from catching on this tube or shaft.

SHUTTERED OUTER WALL

The inner sheet metal wall 83 of the way 85 of the harvester rises a substantial distance above the arms 25 and longitudinal wire 40 of the grape trellis so that any berries thrown laterally by the vertically shaken freely rotatable rotar 175 toward the tractor 45 are intercepted by this inner wall to fall downwardly onto a conveyor as hereinafter described. To avoid loss of berries thrown laterally in the opposite horizontal direction, that is, away from the tractor 45, the harvester is provided with an outer wall indicated generally at 180 which includes a longitudinal row of shutters 181 which pass under the arms 25 of the grape trellis and a longitudinal row of top shutters 182 which pass over the arms 25 of the grape trellis, these shutters moving so as to provide, in effect, a closed outer wall for the way 85 which prevents the escape of berries which are thrown by the harvesting rotor 175 in such direction.

For this purpose, the shuttered outer wall 180 for the way 85 of the harvester is preferably constructed as follows:

The numeral 185 represents a side wall plate which extends the full length of the way 85 and the lower edge of which is hinged, as by a plurality of spaced hinges 186, to the upper edge of the outer bar 76 of the pair of transversely spaced angle-iron bars 75 and 76 at the sides of the bottom of the way 85. These hinges permit this side wall plate 185 to fold or swing toward the tractor 45 or inner side wall 83 but the swinging movement of this side wall plate 185 in the opposite direction is limited by a plurality of stops 188 so that in the operative position of this side wall plate 185, in which it rests against these stops, this side wall plate is at about a 10° included angle with reference to the vertical and a corresponding part of the weight of this side wall plate 185 is supported by these stops. Such a stop 188 is interposed between each having its lower part welded or otherwise secured to the outer side face of the frame bar 76 and having its upper part in the form of an upstanding bar at about the said 10° included angle with reference to the vertical.

Each of the series of lower shutters 181 is in the form of a flat sheet metal plate having, in its raised operative position shown, a horizontal top edge 190, a front edge 191 which extends downwardly and forwardly with reference to the travel of the harvester, a rear edge 192 generally parallel with the front edge 191 and a bottom edge 193, forming a tail piece 194 at the forward bottom corner of each bottom shutter 181.

Each of these tail pieces is pivotally secured to the side wall plate 185 by a generally horizontal pivot pin 195 journalled in the side wall plate and extending horizontally therethrough as best shown in FIG. 10. Each lower shutter plate 181 is disposed against the inner face of the side wall plate 185 with its front edge 191 interposed between this side wall plate 185 and the rear of the next succeeding forward lower shutter 181. The pivot pins 195 are at spaced intervals in a horizontal line along the side wall plate 185 and any suitable means can be provided for journalling these pivot pins in the side wall plate 185 and connecting them to their shutters 181. As best shown in FIG. 10, this is preferably accomplished by welding each of these pivot pins 195 to its shutter 181 as indicated at 196 and by passing each pivot pin through a reinforcing bar 198 welded to the inside face of the side wall plate and forming a bearing 199 for each pivot pin 195.

Each lower shutter 181 is counterbalanced to yieldingly hold it in the upright operative position shown in FIG. 1, such counterbalancing mechanism being shown as constructed as follows:

The numeral 200 represents a counterweight fixed to each pivot pin 195 on the side of the side wall plate 185 opposite from the shutters 181. Each counterweight can be assisted by a helical tension spring 201 connecting its outboard end with an anchoring pin 202 projecting from the side wall plate 185 and which also serves to determine the normal position of the shutter 181. These counterweights and springs are preferably enclosed in a sheet metal housing 203 suitably secured to the side wall plate 185.

At the front end of the side wall plate 185 stray pendant canes 42, together with any bunches of grapes 43 thereon, are guided into the way 85 and into the path of the saw blade 105 by a guide bar 205, a feature of this guide bar being that it is not likely to injure the main trunks 22 of the grape vines 21. This guide bar is shown as being in the form of a rod which is V-shaped in elevation, having an upper leg 206 attached in any suitable manner to the upper front corner of the side wall plate 185 and extending downwardly and forwardly therefrom, and a lower leg 208 welded to the forward end of the bottom horizontal frame bar 76 and extending horizontally forwardly to a nose 209 which joins these two legs.

Each of the series of upper shutters 182 is in the form of a flat sheet metal plate having, in its lowered operative position shown, a horizontal bottom edge 210, a front edge 211 which extends upwardly and forwardly with reference to the travel of the harvester, a rear edge 212 generally parallel with the front edge 211 and a horizontal top edge 213, each plate being thereby parallelogram-shaped in elevation.

The forward top corner of each upper shutter is pivotally secured to the vertical flange of the fore-and aft top frame bar 92 by a generally horizontal pivot pin 215. This pivot pin is shown as being in the form of a loose bolt secured in position by a nut. Each upper shutter drops under its own weight to the normal position shown in FIG. 1 which is determined by a U-shaped guide rod 216 secured to each shutter. For this purpose, as best shown in FIG. 9, the lower offset end of each of these guide rods is secured, as by a bolt 218 to the outer side of its shutter near the center of its front edge 211 and extends upwardly through a slot 219 in the top horizontal flange of the longitudinal top frame bar 92. The offset upper end of each guide bar 216 is secured, as by a bolt 220, to an ear 221 fixed to and projecting upwardly from the upper edge 213 of its shutter closer to the rear edge 212 thereof.

RECEIVING CONVEYER

An endless conveyer, indicated generally at 225, runs longitudinally along the bottom of the way 85 to receive the bunches 43 and berries shaken from the curtain 42 of canes 41 and to convey them toward the rear end of the harvester. This conveyer comprises a slatted endless conveyer belt 226 of the same width as the bottom of the way 85 and supported at its front end by a transverse driven or idler roller 228 and at its rear end by a transverse drive roller 229. As best shown in FIG. 10, the forward driven roller 228 is mounted on a transverse shaft 230 the opposite ends of which extend through the front ends of the pair of bottom longitudinal frame bars 75 and 76 which form the bottom of the way 85, this shaft being supported and journalled in bearings 231. As best shown in FIG. 11, the driving roller 229 is fixed to a transverse shaft 232 the opposite ends of which extent through the rear ends of the pair of bottom longitudinal frame bars 75 and 76, this shaft being journalled in bearings 233 and extending in rear of the tractor 45 and being connected by a chain and sprocket transmission 234 to the power take-off shaft 55 of the tractor as best shown in FIGS. 1 and 2.

ELEVATING CONVEYER

The belt 226 of the receiving conveyer 225 drops the bunches 43 of grapes and berries into the bottom 240 of a transverse trough 241 which extends upwardly from this bottom, transversely of the harvester. In this transverse trough is arranged an elevating conveyor indicated generally at 243. This elevating conveyer comprises a slatted endless belt 244 of the same width as the trough 241 and supported at its lower end in the bottom 240 of the trough 241 by a drive roller 245 and supported at its upper end by a driven roller 246. The drive roller 245 is fixed to a shaft 247 journalled in bearing 248 in the side walls of the bottom 240 of the trough 241 and having a sprocket 249 at one end connected by a chain 250 to a sprocket 251 fixed to the power take-off shaft 56 of the tractor. The driven roller 246 is mounted on a shaft 253 supported by and journalled in bearings 254 in the side walls of the trough at the upper end thereof.

The purpose of the elevating conveyer 243 is to deliver the bunches 43 of grapes, berries therefrom, together with leaves, pieces of canes and other trash to the conveyer of a leaf and trash cleaner and since the features of this leaf and trash cleaner form no part of the present invention, it is not shown.

STEERING GUIDE AND TRELLIS PROTECTOR

As previously described, the upstanding ends 29 of the arms 25 of the grape trellis project upwardly from above the curtain 42 of fruit bearing canes 41 and form a line of guide posts along each row of grape vines. These upstanding ends are clearly visible to the driver seated on the tractor seat 51, and to avoid injury to the trellis in such close steering of the tractor (to insure the curtain 42 of canes 41 passing through the way 85 properly positioned with reference to the rotor 175 of the shaker mechanism 120 travelling along the side of this curtain), the harvester is provided with a cam bar 260 which passes in close proximity to the line of these guide posts 29 as the harvester is closely steered along its row of grape vines by the tractor 45. As best shown in FIG. 2, this cam bar comprises an arm 261 having one end suitably fixed to the side wall 83 and projecting horizontally outwardly into the way 85 transversely thereof and close to the longitudinally reciprocated upright sleeve 170 of the shaker 120. This arm 261 is continued to provide a free end 262 which projects horizontally toward the front of the harvester at an acute included angle of about 30° to the inner wall 83 of the way 85 as shown in FIG. 2

The driver seated on the tractor seat 51 can see both the line of guide posts or projections 29 projecting up from the top of the curtain 42 of fruit bearing canes and also the guide bar 260 on the wall 88 to his immediate right.

The driver steers the harvester by lining up some post or other high part of the frame 46 with this line of projections as the point of aim and holds the line of travel of the harvester closely to such path. By so steering the tractor using the line of guide posts or upward projections 29 of the trellis of the grapes being harvested as guides or points of aim, he is assured that the curtain 42 of fruit bearing canes is traversed so that the arms 178 of the rotor 175 enter the curtain 42, contact the supporting longitudinal trellis wire 40, shake the wire and curtain vertically to shake off the bunches 43 of grapes and leave the curtain for reentry as the harvester continues its movement through the vineyard.

In the event the guide bar 260 forcibly contacts and moves one of the upright projections 29 (toward the line of grape stakes 20), in such close steering, no harm is done, the corresponding arm 25 fulcruming upwardly on its grape stake at the upper edges 34a of the downward continuation 28 of this trellis arm 25, and pulling out the nail 36 a short distance (as shown in FIG. 4) as previously described.

OPERATION

The grape vines 21 are planted in the spaces between the posts 20 in spaced relation to one another and in spaced relation to the posts. The main trunk 22 of each vine is trained to the bottom trellis wire 23 and thence to the main longitudinal trellis wire 40 at the outer end thereof at which point the canes 41 are trained along this longitudinal trellis wire 40 to grow into a curtain 42 of canes growing along and suspended from the wire 40 and from which canes the bunches 43 of grapes to be harvested are supported in pendant positions.

When the grapes are ripe the frame 46 of the grape harvester is mounted on the tractor 45 and is propelled into the vineyard so that each curtain 42 of canes 41 together with their bunches 43 of grapes, pass through the way 85 from the front end thereof. To this end the driver of the tractor 45 steers it so that the upwardly projecting ends or guide posts 29 of the trellis (which are visible to him from above the curtain 42 of fruit bearing canes 41 being harvested) pass close to the guide bar 260 on the harvester frame at his immediate right. When so guided the bar cutter 95, 105 travels along the bottom of the curtain 42 of fruit bearing canes supported by the longitudinal trellis wire 40. Accurate guiding of the tractor and harvester is necessary both to obtain the maximum harvest and also to avoid injury to the trunks 22 of the vines, the growth of a producing grape vine requiring a long period of time and a great deal of effort and expense in cultivation.

As the harvester travels along the row of grape stakes 20 with the cutter 95, 105 at the bottom forward end of its way 85 traveling under the grape bearing curtain 42 of canes on the longitudinal trellis wire 40, the movable toothsaw bar 105 of this cutter is reciprocated back and forth in its toothed stationary holder 95 by the hydraulic motor 110 and crank disk 112 and link connection 114 illustrated in FIG. 13. Since the moving teeth 108 of the moving saw bar 105 and the stationary teeth 101 of the stationary holder project forwardly and cooperate with each other, they cut off the ends of any canes 41 in the curtain 42 which droop down to the ground thereby to prevent these excessively long canes from becoming tangled in any part of the harvesting mechanism or requiring special mechanism to remove such cane ends.

As the harvester moves along the longitudinal trellis wire 40 and encounters the arm 25 and the transverse supporting wire 31 of the grape stake 20, the arm 25 progressively engages the leading edges 191 of the succession of bottom shutters 181 and moves them downwardly. Thus as each trellis arm 25 encounters the leading edge 191 of a bottom shutter 181, it withholds the same against continued movement along with the harvester, thereby to swing it downwardly about its pivot pin 195 at its front lower corner, the trellis arm 25 riding along the front and top edges 191, 190 of this bottom shutter 181 until it passes beyond the rear end of the top edge. When this occurs, the counterweight 200 and helical tension spring 201 returns the lower shutter 181 to its normal position illustrated in FIG. 1 in which its upper edge is horizontal and is in overlapping relation with the lower edge of a companion top shutter plate 182 so as to form, in effect, a closed shutter wall 180.

Similarly, as the harvester moves along the line of grape stakes 20, the transverse wires 31 supporting the arms 25 of the trellis engage and lift the succession of top shutters 182. Thus, as the leading edge 211 of each top shutter plate engages a transverse wire 31 its forward movement is restrained and it is caused to swing upwardly about the pivot pins 215 at the front upper corner thereof. In this movement the wire travels along the front and bottom edges 211 and 210 of this top shutter 182 and on leaving the end of the bottom edge, the transverse trellis wire 31 permits the top shutter to fall to its normal position illustrated in FIG. 1 in which its bottom edge 210 is horizontal and in overlapping relation with the top edge 190 of a companion bottom shutter plate 181 so as to restore the shuttered wall 180 to its closed condition. Each top shutter plate is guided and prevented from flapping sidewise by its U-shaped guide bar 216 which rides in a corresponding slot 219 in the top longitudinal frame bar 92, this guide bar also limiting the downward movement of its top shutter plate to the normal position shown in FIG. 1.

The freely rotatable rotor 175 is positioned in the way 85 so that its hub 176 travels along the side of the curtain 42 of fruit bearing canes supported by the longitudinal trellis wire 40 and so that the bars or arms 178 radiating from this hub successively enter this curtain of canes, the resistance of the curtain of canes serving to rotate the freely rotatable rotor 175 as it travels along the trellis. Each arm or bar 178 enters the side of the curtain 42 of canes 41 to be caught thereby and, during the forward movement of the harvester, is brought to a position under and perpendicular to and preferably in engagement with the under side of the longitudinal trellis wire 40. Following this the continued forward movement of the harvester causes this bar or arm 178 to become a trailing arm leaving the curtain 42 of canes to reenter the same as the forward movement of the harvester continues.

It is important that the bars or arms 178 of the rotor 175 travel below the longitudinal trellis wire 40 and preferably in contact therewith and to this end the operator can raise or lower the rotor 175 and can also withdraw it horizontally transversely from the side of the curtain 42 of canes 41 supported by the longitudinal trellis wire 40 so that in the event he fails initially to position the rotor 175 so that its arms 178 travel under and in engagement with the longitudinal trellis wire 40, or, if during the harvesting operation such engagement should be lost, he can reposition the rotor 175 to its proper operating position in which its arms 178 engage the under side of the longitudinal trellis wire 40.

To effect such upward and downward positioning of the rotor 175, the operator, through a manual control valve (not shown), introduces hydraulic fluid into one or the other ends of the cylinder 136. This shifts its piston 138 and piston rod 138 in a corresponding direction thereby to move the cross bar 140. FIG. 17, and side plates or frames 128 of the first carriage 126 up or down with these side frames or plates 128 sliding up and down the stationary rods 125. These side frames or plates 128 carry the sprockets 131 and the chains 132 therebetween and since one vertical stretch of each of these chains 132 is anchored, as at 134, the vertical movement of the opposite vertical stretch of this chain is double that of the upper movement of the side frames or plates 128. This doubled mechanical movement is transmitted to the pair of side plates or frames 144 of the second carriage 143, which side plates or frames are also slidingly mounted on the stationary vertical rods 125 and which carry the mechanism which supports and shakes the rotor 175 vertically as hereinafter described.

If the arms 178 of the rotor 175 should fail to, or lose contact with the under side of the longitudinal trellis wire 40, the operator introduces fluid under pressure into the corresponding end of the cylinder 155, thereby to shift its piston 156 to drive its piston rod 158, FIG. 15, inwardly. This shifts the cylindrical slide 148 and its head 150 inwardly thereby to move the mechanism which supports and shakes vertically the rotor 175 as hereinafter described and remove its arms 178 horizontally from the curtain 42 of canes 41. The operator can then shift this rotor upwardly or downwardly by introducing fluid into the corresponding end of the cylinder 136, FIG. 17, as previously described and he then introduces fluid into the corresponding end of the cylinder 155, FIG. 15, so as to cause the arms 178 of the rotor 175 to reenter the curtain 42 of canes at the newly selected elevation.

Ripe grapes forming the pendant bunches 43 are harvested, both as clusters and also as individual berries shaken from these bunches, by shaking or oscillating the rotor 175 vertically, preferably at a speed of about 350 to 600 c.p.m. and at an amplitude of about 3 to 6 inches. This shaking is effected by the energizing of the hydraulic motor 164, FIG. 15, which, through the drive belts 162 and pulleys 161 and 163 drives the shaft 160 journalled in the longitudinally movable spindle 148. Through its crank pin 168 and link 169 this shaft reciprocates the tube 170 longitudinally along the upright rod 171, the upper end of which is fixed through the bracket 172 to the end head 150 carried by the longitudinally movable spindle 148. The rotor 175 is mounted for free rotation at the lower end of this tube 170 but is compelled to move upwardly and downwardly therewith thereby to shake up and down the longitudinal grape trellis wire 40 and the curtain 42 of fruit bearing canes supported thereby. The inertia of the fruit in the bunches 43 of grapes causes the fruit to shake loose from the canes 41 either as berries or as bunches and to fall to the bottom of the way 85.

The angularity of the arms 178 of the rotor 175 with reference to the axis $x$—$x$ is important in causing this rotor to track the under side of the longitudinal grape trellis wire 40 both when traveling down its sag and up its sag between grape posts. Thus it will be noted that these arms converge upwardly from their outer ends toward this axis $x$—$x$ of the rotor at an included angle of about 60° as best shown in FIGS. 7 and 8. This umbrella-rib-like relation of these arms 178 to the axis $x$—$x$ causes the outer ends of these arms 178 to enter the curtain 42 of canes at a lower elevation than its supporting longitudinal trellis wire 40 and, as these arms move into this curtain, causes them to exert an upwardly lifting force on this curtain as well as the wire. The contact with the wire 40 occurs at a distance inwardly from the outer extremity of each arm 178 and the difference between the elevation of this point of initial contact with the wire 40 and the outer end of the arm represents a tolerance which insures proper operational engagement. Following this initial engagement with the wire 40, as each arm 178 of the rotor 175 is brought to perpendicular relation with the wire it continues to lift the wire and exerts an upward pressure thereagainst and since the arm is being shaken vertically at an amplitude of from 3 to 6 inches at from about 350 to 600 c.p.m., this shaking movement is transmitted via the longitudinal grape trellis wire 40 itself to the entire curtain 42 of fruit bearing canes supporting thereby to effectively shake the fruit from this curtain of canes.

The angularity of the axis $x$—$x$ of the rotor 175 with reference to the axis $y$—$y$ of its supporting tube 170 is also important in obtaining optimum tracking of the arms 178 of the rotor 175 with reference to the longitudinal trellis wire 40. Thus, as viewed from the side of the machine, as shown in FIG. 8, these axes lie in a common plane which inclines upwardly and forwardly at an angle of about 20° with reference to the vertical. As will be apparent from an inspection of FIG. 8, this angularity causes the entering (right hand) arm 178 of the rotor 175, as shown in this figure, to enter the curtain 42 of canes 41 (not shown in FIG. 8) at a much lower elevation with reference to the longitudinal trellis wire 40 than if the axis $x$—$x$ of the rotor were vertical as viewed from the side of the machine.

Also as viewed from the front or rear of the machine the axis $x$—$x$ of the rotor 175 is desirably at an included angle of about 30° with reference to the axis $y$—$y$ of its supporting tube 170, this latter axis being substantially vertical as viewed in this plane and the axis $x$—$x$ of the rotor inclining upwardly and outwardly away from the tractor 45.

As will be apparent from an inspection of FIG. 7 it will again be noted that this angularity causes each arm 178 of the rotor 175 to be moved to a maximum elevation when it is perpendicular to the longitudinal trellis wire 40, thereby to impart the maximum upward pressure on this wire and to impart the maximum shaking effect to the curtain 42 of canes supported by this wire.

As the berries and bunches 43, of grapes are shaken from the curtain 42 of fruit bearing canes 41 into the way 85, those berries and bunches which are deflected toward the tractor 45 are intercepted by the unbroken or continuous sheet metal wall 83 which forms the corresponding side of this way. Those berries and bunches which are deflected away from the tractor 45 are intercepted by the abutted wall 180 composed of the upper row of shutters 182 and the lower row of shutters 181. The continuous sheet metal inner wall 83 and shuttered wall 180 converge downwardly to lead all such falling bunches of grapes and berries onto the upper stretch of the endless conveyor belt 226 which conveys them to the rear end of the harvester.

As the machine moves along the row of grape vines 21 being harvested, the upper and lower shutters 182, 181 of its shuttered wall 180 open up to accommodate the arm 25 and transverse grape post wire 31 of each passing grape post 20. Thus as the harvester moves along, its bottom shutters 181 progressively engage the arms 25 of the grape posts 20 which it passes. Each shutter 181 engages each trellis arm 25 with its forward edge 191 and, since the trellis arm is stationary, it restrains the shutter and causes this edge to ride along the trellis arm 25, thereby to swing the lower shutter 181 downwardly about the axis of its pivot pin 195 and against the resistance of its counterweight 200 and helical return spring 201. The continued forward movement of the harvester causse the trellis arm 25 to ride along the top edge 190 of each lower shutter 181 until it engages the forward edge 191 of the next succeeding bottom shutter and travels beyond the top edge 190 of the shutter which it has displaced. When this occurs the counterweight 200 and return spring 201 of this displaced shutter swings it upwardly about the axis of its pivot pin 195 returning its upper edge 190 to the horizontal position shown in FIG. 1 and in which this upper edge portion is in overlapping relation with the bottom edge portion of a companion upper shutter 182 of the shutter wall.

As the harvester moves along the row of vines being harvested, its upper shutters 182 progressively engage and are moved out of the way by the tranverse grape post wires 31. Thus, as each transverse grape post wire 31 comes into engagement with the forward edge 211 of an upper shutter 182, it displaces this shutter rearwardly and upwardly, the shutter swinging about the axis of its pivot bolt 215. In this movement the upper shutter is guided against undue sideways flapping by its guide rod 216 which travels upwardly in its slot 219 in the longitudinal bar 92 of the frame of the harvester. The transverse grape post wire 31 travels along the front and bottom edges 211 and 210 of each upper shutter 182 until it reaches the rear end of the bottom edge 210 when it releases the upper shutter 182 to fall back by gravity to the position shown in FIG. 1 in which its lower edge 210 is horizontal.

It will be seen that the shuttered wall 180 insures against loss of berries or bunches of grapes deflected by the shaking mechanism away from the tractor 45 and at the same time accommodates the trellis arms 25 and transverse wires 31 of the grape posts by moving out of the way when these are encountered.

The bunches and berries of grapes are discharged from the rear end of the horizontal endless conveyor belt 226 traveling along the bottom of the way 85 into the bottom 240 of the inclined transverse trough 241. From this bottom 240 the berries and bunches of grapes are picked up by the upper stretch of the endless elevating conveyor belt 244 and conveyed upwardly to the opposite side of the harvester.

This elevating conveyor belt can deliver the bunches and berries of grapes, together with leaves and other trash, into a leaf and trash separator (not shown) which forms no part of the present invention.

From the foregoing, it will be seen that the present invention provides a highly effective grape harvester which can be moved rapidly and accurately through a vineyard to harvest a large quantity of grapes with minimum loss of and injury to the fruit as well as to the vines and the trellis on which the vines are trained. It will further be seen that the harvester achieves the objects and has the advantages initially set forth.

I claim:

1. The method of harvesting grapes from vines trained into the form of a suspended curtain of grape bearing canes, which comprises projecting a generally horizontal arm endwise into said curtain from one side thereof, and moving said arm transversely to shake the grapes from said grape bearing canes.

2. The method set forth in claim 1 wherein said arm is moved upwardly.

3. The method set forth in claim 1 including the additional step of catching the fruit shaken from the fruit-bearing canes.

4. The method of harvesting grapes from the grape-laden portions of vines supported on a generally horizontal wire, which comprises projecting from one vertical side of said wire a generally horizontal arm endwise into said grape-laden portions below said wire, and cyclically raising said arm toward said wire to vibrate said grape-laden portions so as to remove inertially the grapes therefrom.

5. The method set forth in claim 4 including the additional step of catching the grapes inertially removed from said grape-laden portions.

6. The method set forth in claim 5 wherein said arm is withdrawn from said grape-laden portions following its projection thereinto and has no substantial movement relative to said grape-laden portions in a direction extending longitudinally of said wire while being projected into and withdrawn from said grape-laden portions.

7. The method of harvesting grapes from a row of vines having grape bearing canes trained to hang as a curtain from a generally horizontal wire, said method being practiced utilizing an arm the support for which continuously travels along the row and comprising the steps, performed successively at intervals along the row, of first projecting said arm into said curtain from one side thereof below said wire and then withdrawing said arm from said curtain, and cyclically raising said arm toward said wire to vibrate said curtain while penetrated by said arm so as to remove inertially grapes from said canes, said arm while penetrating said curtain having no substantial movement relative to said curtain in a direction extending longitudinally of the row.

References Cited

UNITED STATES PATENTS

| | | | |
|---|---|---|---|
| 2,929,184 | 3/1960 | Lamouria | 56—331 |
| 3,184,908 | 5/1965 | Rust | 56—330 |
| 3,439,482 | 4/1969 | Orton | 56—330 |

RUSSELL R. KINSEY, Primary Examiner

UNITED STATES PATENT OFFICE
CERTIFICATE OF CORRECTION

Patent No. 3,545,183                     Dated December 8, 1970

Inventor(s) Edwin Stanley Shepardson

It is certified that error appears in the above-identified patent and that said Letters Patent are hereby corrected as shown below:

Column 1, line 42, "opened" should be --spaced--

Column 5, line 73, "shakes" should be --shaken--

Column 6, line 22, "effecing" should be --effect

Column 6, line 40, insert after "bunches" --43 of grapes supported by this wire. The berries of the bunches--.

Column 8, line 59, after "each" insert --of the hinges 186 and is in the form of a vertical bar--.

Column 10, line 8, "extent" should be --extend--

Column 10, line 27, "bearing" should be --bearir

Column 14, line 24, "abutted" should be --shuttered--.

Column 14, line 45, "causse" should be --causes-

Signed and sealed this 23rd day of March 1971.

(SEAL)
Attest:

EDWARD M. FLETCHER, JR.  
Attesting Officer

WILLIAM E. SCHUYLER,  
Commissioner of Paten